3,499,144
APPARATUS FOR SAMPLING AND ANALYZING
PULVERULENT MATERIAL
Jacques Juillet, Paris, and Gérard Charbonnier, Bretigny-sur-Orge, France, assignors to Compagnie Generale d'Automatisme, Paris, and Compagnie Generale d'Enterprises Electriques, Perret, France, and Metallgesellschaft A.G., Frankfurt am Main, Germany
Filed Mar. 11, 1966, Ser. No. 533,618
Claims priority, application France, Mar. 25, 1965, 10,714
Int. Cl. G01n 23/20
U.S. Cl. 250—51.5
26 Claims

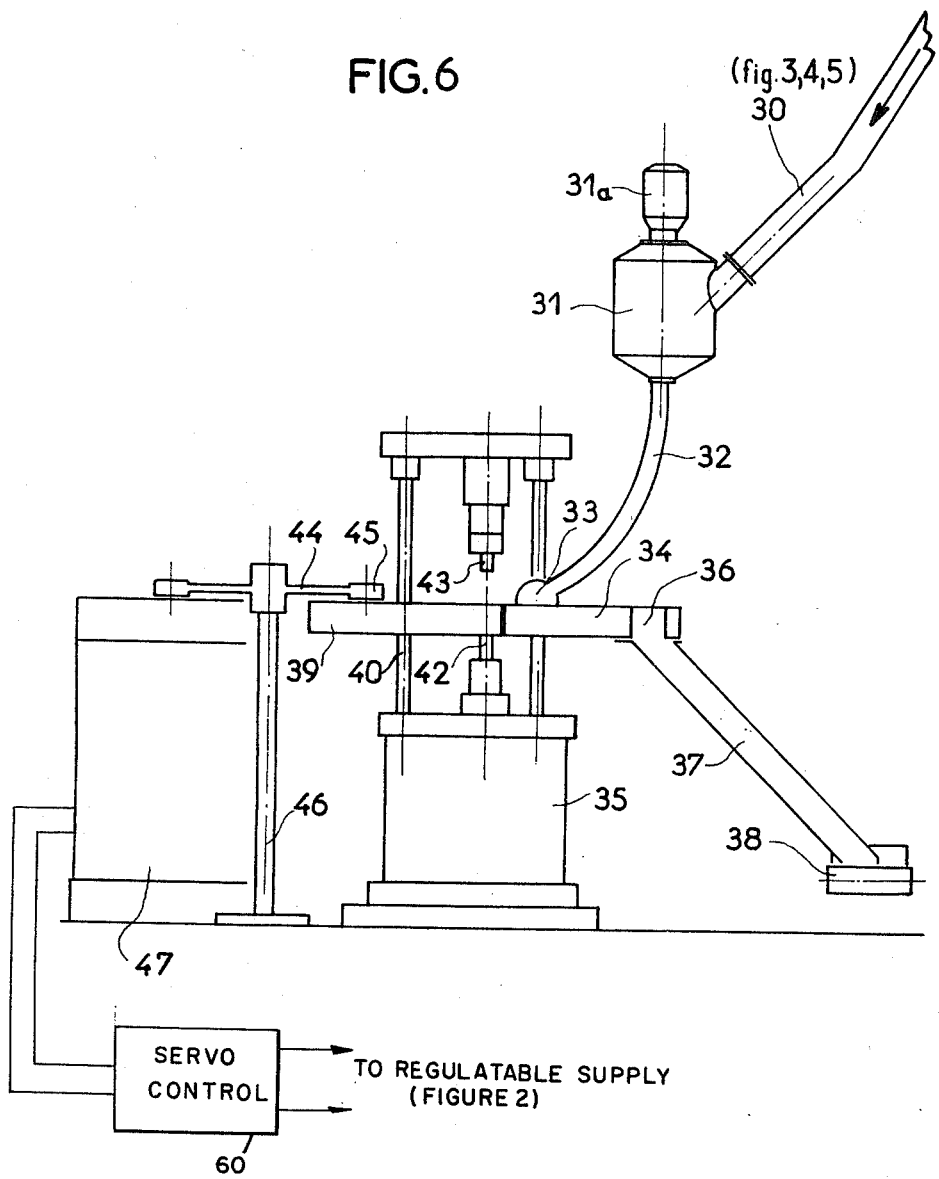

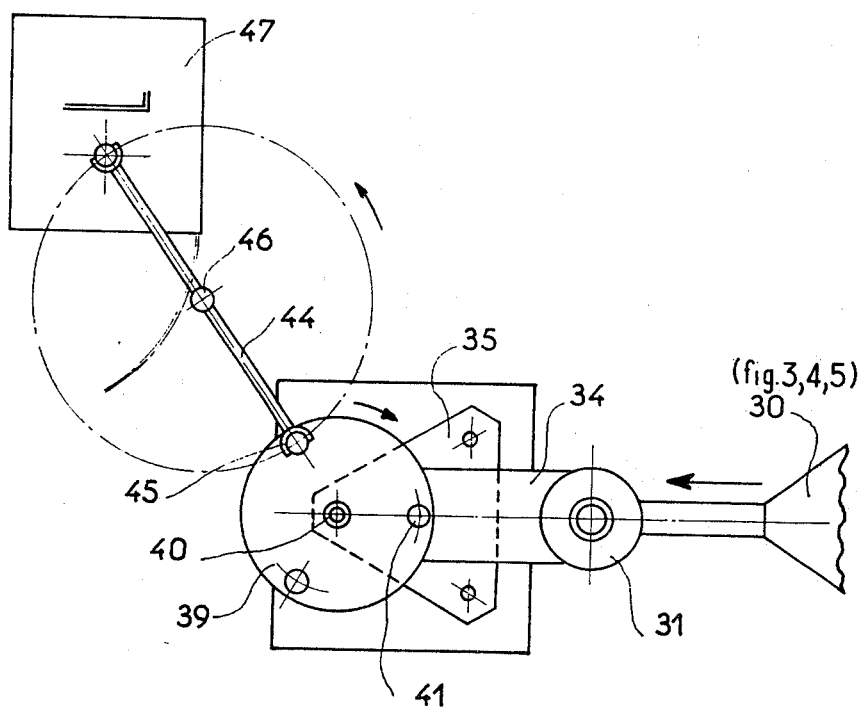

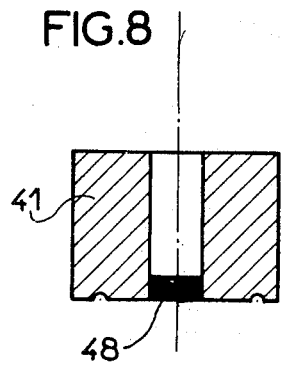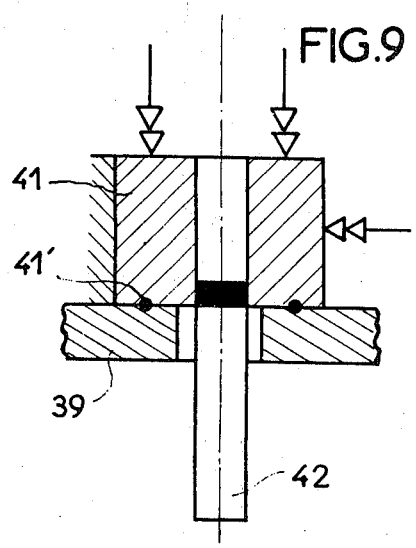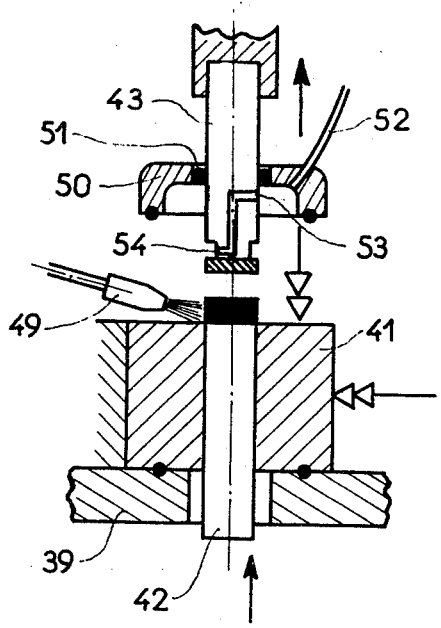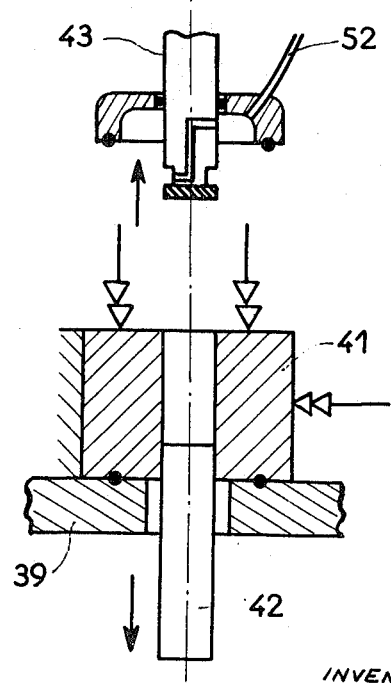

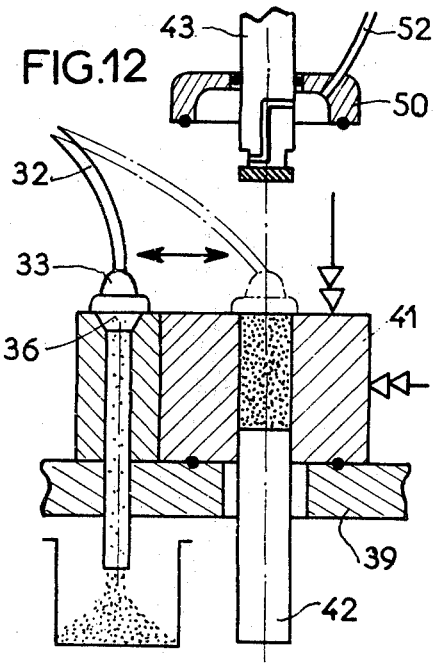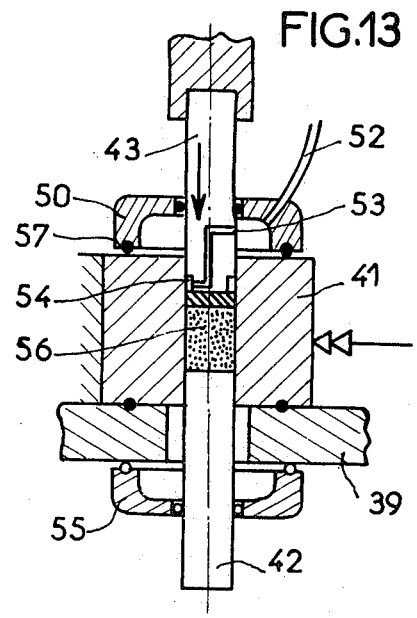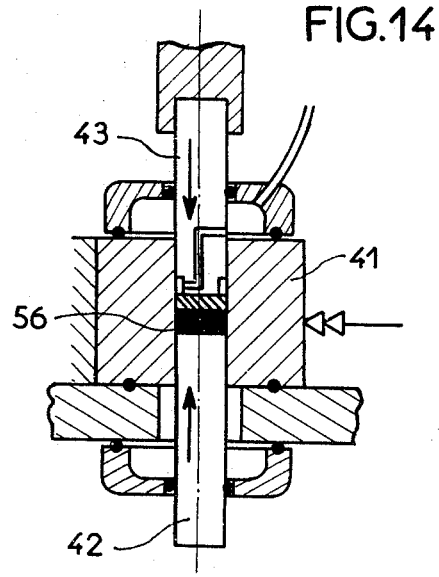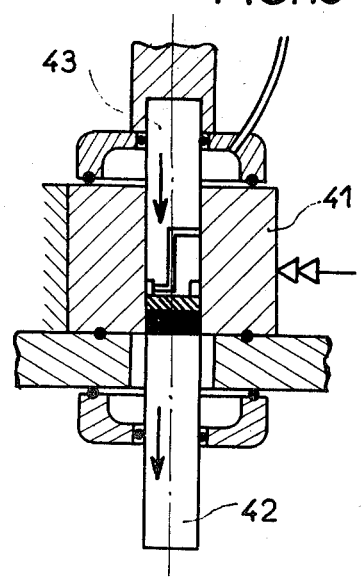

ABSTRACT OF THE DISCLOSURE

An installation for taking samples from a mixture of pulverulent or granular substances obtained in a continuous process for the formation of tablets from said mixture with a view toward analyzing the same, the installation including a first sampler and a second sampler disposed in series with a first mill accommodated between said first sampler and said second sampler, the installation further including a filter and a particle size selector disposed downstream of the second mill and upstream of a final mixer, automatic means for supplying the product issuing from the final mixer to a press which forms the tablets, and means for transferring automatically and successively each of the tablets thus formed into an analyzing apparatus for effecting fluorescent examination of the material subjected to X-ray radiation.

---

The present invention relates to a process and apparatus for taking continuous samples of a granular or pulverulent product and for analyzing this product as to its composition or characteristics in a continuous manner.

Various processes and apparatus for effecting analyses on granular or pulverulent products have been proposed to date, and these processes generally fall within two categories.

In some of these known processes, the analysis is effected continuously, for example directly on the conveyor band or belt which is transporting the products, or on an emulsion or suspension of the products, but these processes, in order to provide highly accurate results, require a high degree of homogeneity and a stability in the products being analyzed which is realized in practice only in very special or unusual cases.

In accordance with other known processes, the analysis is effected in a discontinuous manner, and in this case the precision is greater but depends on the ability of the operator to accurately select representative samples, and furthermore, the results of the measurements are obtained only at the end of a long period of time after taking the sample, which does not permit an expedient use of the information thus being obtained.

The present invention provides a process and apparatus for effecting continuous sampling and analysis of pulverulent products which avoids or altogether eliminates the disadvantages inherent in the known devices.

The present invention is directed to a process and an apparatus for continuously taking samples of a mixture of substances obtained in a continuous process and for forming tablets therefrom which are periodically and automatically submitted to an analyzing device. The present invention is particularly, although not exclusively, applicable to the measurement of the proportions of certain constituents of said mixture by means of the examination of the fluorescence of the tablets under exposure to X-rays.

It is an object of the present invention to provide, in the course of any process for providing a mixture of solid coarse substances obtained in a continuous manner, means for furnishing at each instant samples which are representative of the mixture, that is to say, which have strictly the same composition as the latter at that instant, and wherein the constituents of the mixture are presented in a sufficiently divided and homogeneous form so that the analysis of the fluorescence thereof under the action of X-rays allows for an exact measurement of the proportion of the constituents of the mixture.

The process according to the present invention which makes it possible to solve the problems encountered heretofore has essentially the following characteristics: At least two operations are carried out in succession, each operation comprising a continuous sampling of the substance to be analyzed and a subsequent grinding of the sampled substance, the final grinding operation producing sufficiently fine particles to insure the accuracy and dependability of the analyses and, in the particular case of the analysis of the fluorescence under the action of X-rays, to produce particles of which at least 90% have a granulometry comprised between 1 and 20 microns, and preferably between 1 and 6 microns.

In the course of the final grinding operation, a selection is made for extracting the particles as soon as they have attained the desired granulometry, and the products obtained are then compressed into tablets by means of a press operating under vacuum. The tablets are then immediately submitted to a measuring apparatus, such as an apparatus for analyzing the fluorescence of the tablets when subjected to the action of X-rays.

In accordance with the invention, quantity of the finely pulverized substance is at least 100 times greater than the quantity actually analyzed. In this way, the irregularities run off in the course of the grinding operation will become negligible and it will be possible to provide for the admission into the final grinder of particles processed by a primary relatively simple grinder not requiring a preliminary drying, said particles having a size of several millimeters while at the same time furnishing a representative sampling of the mixture by reason of the great quantity of the ground substance sampled.

An installation for carrying out the aforementioned process will now be described by way of example wherein the analysis is based upon the detected basicity of a mixture of iron ores, this basicity being defined here with respect to the weight of calcium and silicon oxides contained in the mixture. However, it should be understood that the invention is not restricted to this type of analysis, but may be applied to any of the testing procedures utilized for analysis of such products.

These and other features, objects and advantages of the present invention will be apparent when taken in connection with the accompanying drawings, which illustrate one embodiment of the instant invention, and wherein.

Figure 3:
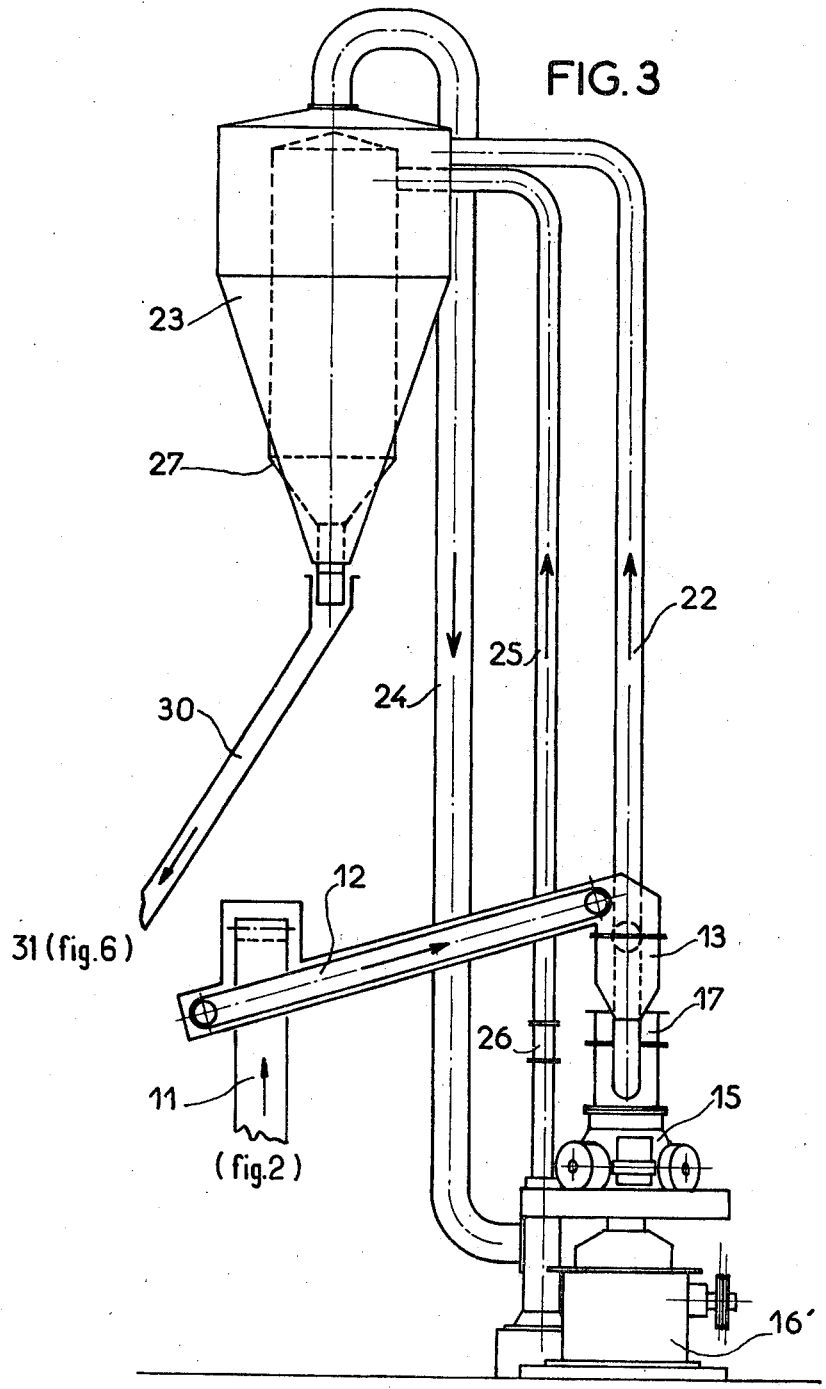
FIGURES 3, 4 and 5 are elevational, cross-sectional and plan views, respectively, of that part of the installation in accordance with the invention which accomplishes the grinding of the samples having been collected by the apparatus of FIGURES 1 and 2.
Figure 4:
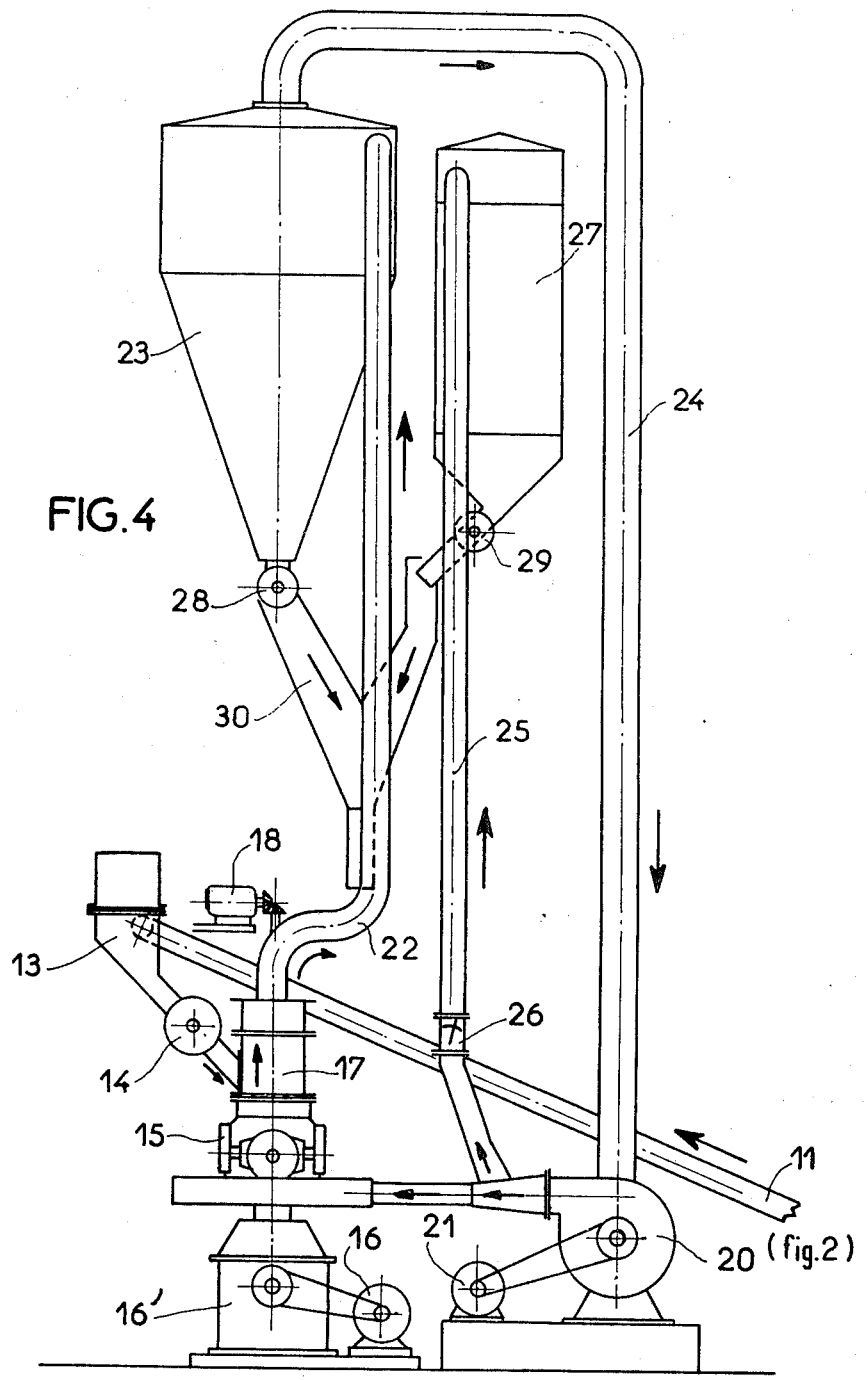
Figure 5:
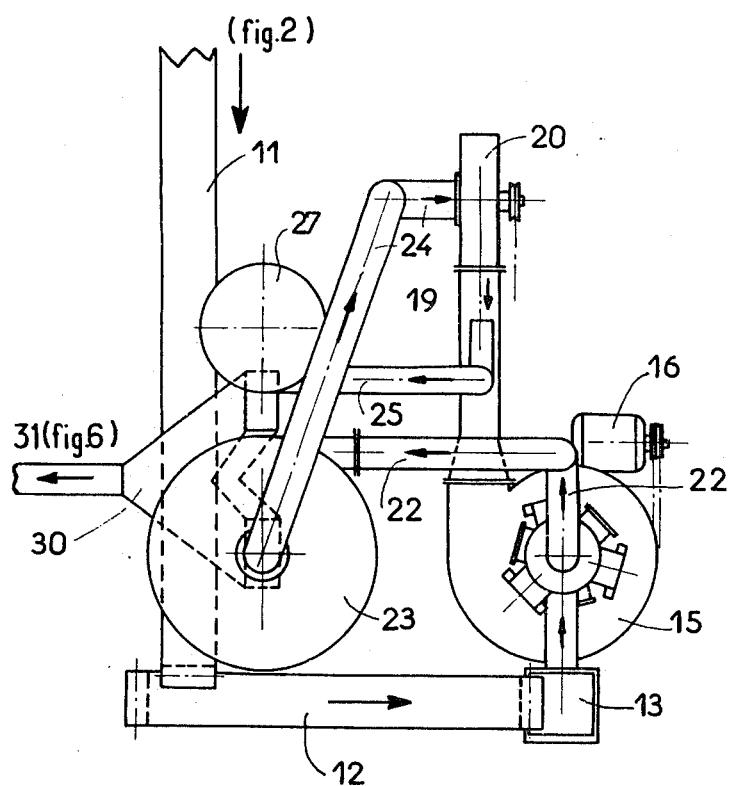

FIGURES 6 and 7 are elevational and plan views, respectively, of that part of the installation in accordance with the invention which accomplishes the formation of tablets from the samples having been ground by the apparatus of FIGURES 3, 4 and 5; and FIGURES 8 to 15 are detail views of that part of the installation in accordance with the invention which accomplishes the formation of tablets from the ground samples in different stages of operation thereof.

Figure 1:
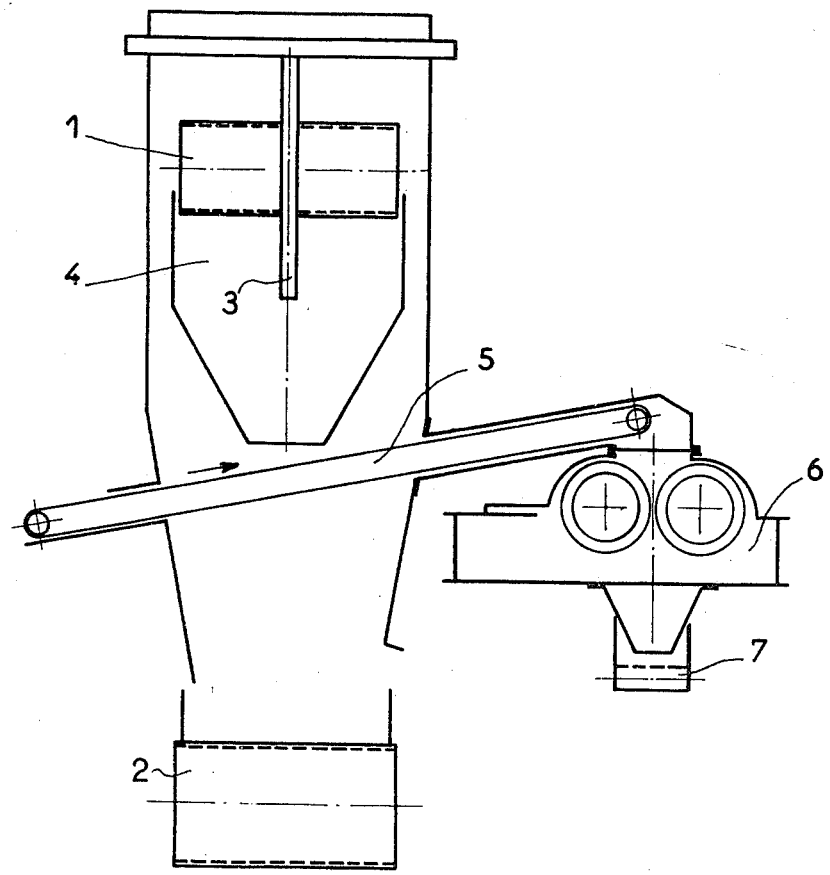
FIGURES 1 and 2 are elevational and cross-sectional views, respectively, of that part of the installation in accordance with the present invention which accomplishes the taking of samples.
Figure 2:
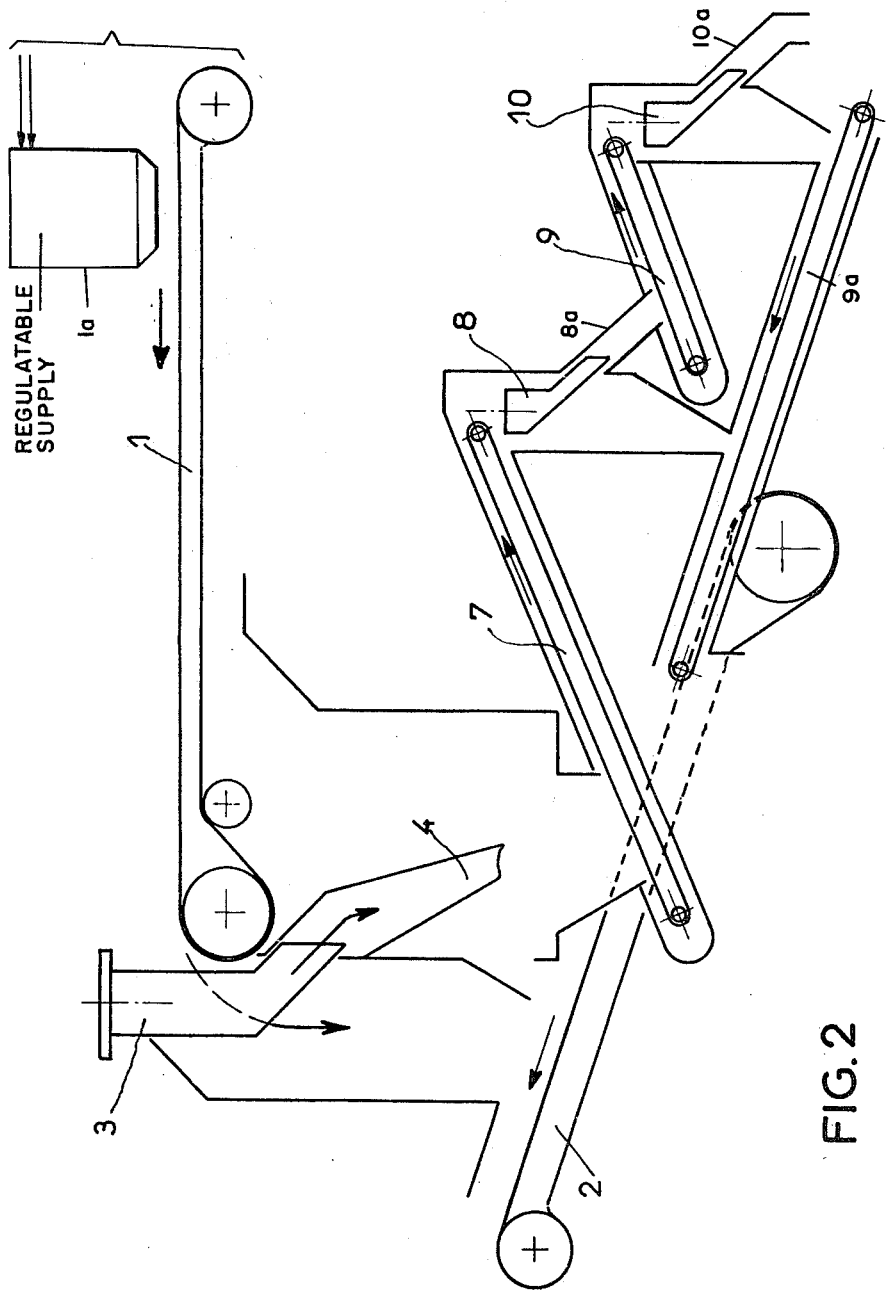

Looking now more particularly to the drawings, wherein like reference numerals have been used throughout the several views to designate common elements, wherever possible, and more particularly to FIGURES 1 and 2, reference numeral 1 designates a conveyor band or belt on which is dispensed from a regulatable supply 1a the mixture of which one desires to determine the composition by taking therefrom and analyzing samples in a continuous manner. The primary conveyor band 1 dispenses the mixture onto an evacuating band 2 which transports or conveys it toward utilizing devices whose nature is outside of the domain of the present invention. Thus, in order to effect analysis of the material, the invention provides an installation to remove a part of the mixture during the course of its passage, which installation diverts a portion of the material, processes it and analyzes it between the bands or belts 1 and 2 in a continuous manner.

The installation in accordance with the invention includes a first unit called a "primary sampler" composed of a narrow spout or trough 3 which is driven by a conventional drive (not shown) with an alternating or reciprocating movement transverse to the direction defined by the band or belt 1 at the dispensing end of the belt so as to traverse the falling stream of material in such a manner as to sweep a portion of the mixture into its chute whose content is then discharged by means of a hopper or funnel 4 onto a conveyor band or belt 5, which is referred to as the "collector band of primary sampling." The band 5 is offset from the fall line between the belts 1 and 2 (FIGURE 2) so that the substances arriving on the band or belt 1 which are not collected by the spout 3 fall directly onto the evacuating band 2.

The band 5 feeds the sample to a roller crusher or grinder 6 (FIG. 1) which is referred to as the "primary crusher or grinder" at the outlet of which the crushed substances fall onto a conveyor band or belt 7 which conveys them to a second unit which is referred to as the "secondary sampler" (FIGURE 2), and comprises a first spout-hopper 8 and funnel 8a similar to the trough 3 and funnel 4 combination. At the outlet of the funnel 8a the collected substances fall on an auxiliary band or belt 9 whereas the substances which have not been collected by the spout-hopper 8 fall directly on a band or belt 9a which feeds or conveys them back to the evacuating band or belt 2. The conveyor band or belt 9 feeds the substances having issued from the spout-hopper 8 and funnel 8a to a second spout-hopper 10 and funnel 10a. The substances which have not been collected or gathered by this group fall on the band 9a, whereas the collected substances fall on a conveyor band or belt 11 which guides them toward a crushing station, such as that shown in FIGURES 3, 4 and 5.

In the installation described by way of example, the primary conveyor band or belt 1 for the mixture, for example, a mixture of iron ores, has a useful width of one meter and a passing velocity of about one meter and a half per second; it delivers 150 tons per hour of a mixture composed of grains having a size which is normally up to 10 millimeters; a small portion thereof may, however, exceed this size. The spout 3 of the primary sampler has preferably a width of 25 mm. and is laterally displaced in a reciprocal manner at a speed of from 10 to 50 centimeters/second and preferably at 20 to 30 centimeters/second in such a manner than the quantity in tons of the mixture which it removes per hour is $$150 \times \frac{25}{1000} = 3.75 \text{ tons}$$

(if the ratio of the width of the spout 3 to that of the band 1 is 25/1000).

The conveyor band or belt 7 has a width of 250 millimeters. The primary crusher 6 being disposed so as to dispense material on this band or belt 7 resets the average size of the grains of the mixture between 0 and 6 millimeters, and preferably smaller than 3 millimeters.

The secondary sampling unit due to its dimension removes from the substance collected by the primary sampler material at a rate of approximately 120 kilograms per hour. The secondary sampling has been divided into two identical stages by reason of the importance of this reduction of the charge $$\left(\frac{120}{7500} = \frac{1}{64}, \text{ approximately}\right)$$

and, also, in order to preserve a sufficient opening of the spout 8 for allowing a correct sampling of even the largest grains. The conveyor band or belt 7, as has been set forth, has a width of 250 millimeters and the spout 8 disposed downstream has a width of 30 millimeters.

It should be understood that the substances which are not retained in the different stages of operation and which thus do not arrive at the band or belt 11 are finally returned to the evacuating band or belt 2. It should also be mentioned that in case coke must be incorporated into the mixture, this incorporation may be made either upstream of the primary sampler, or downstream of it; however, in the latter case the coke will not be found in the analyzed mixture.

FIGURES 3, 4 and 5 illustrate the part of the installation in accordance with the invention which effects the final grinding or crushing of the mixture selected by the sampling unit according to FIGURES 1 and 2. One extremity of the conveyor or transporting means 11 which forms a continuation of the other extremity is visible in FIGURE 2 as shown in these figures. At the outlet of this transporting means, the substances fall onto an auxiliary conveyor band 12 which transports them to the final grinding or crushing unit. The latter comprises the following elements: a hopper 13 placed at the outlet of the band 12 which feeds, by means of a distributor 14 (FIGURE 4) a roller grinder or crusher mill 15 of conventional construction driven by a motor 16 and a speed reducer 16'; a pneumatic turbine selector 17 driven by a motor 18 is supplied with air heated by a torch and furnished by a ventilator or blower 20 driven by a motor 21; the selector 17 is placed at the outlet of the grinder 15 and by means of a system of pipes 22, sends forth the air charged with crushed material into a cyclone 23 at the outlet of which the air returns to the blower 20 by means of a system of pipes 24.

The pneumatic selector 17 plays the role of a filter by allowing the particles whose dimensions are smaller than a predetermined value to pass into the pipes 22 and by returning the remaining particles to the crusher; the unit of crusher and selector is regulated, in the example under consideration, in such a manner as to allow only the passage of particles having a size which is equal at the most to about 10 microns.

The torch has the function of heating the air at the inlet of the crusher to about 300° C. so as to dry the particles during the pulverizing process, both in order to avoid clogging of the crusher or mill and in order to allow for the normal operation of the selector.

Since the air which is returned to the blower 20 by means of the pipe 24 still contains extra fine particles that have not been selected or removed by the cyclone 23, the blower additionally supplies by means of a pipe 25 equipped with a charge-adjusting device 26, a vibrating filter 27 (FIG. 5) terminating into the atmosphere with only this latter part of the installation being under pressure. The particles having been gathered at both the outlet of the cyclone 23 and at the outlet of the filter 27 are transported, respectively, by means of a rotary distributor 28 and 29 to the two inlets of a common collector hopper 30. At the outlet thereof, the particles are fed into a mixer 31 which is driven by a motor 31a (FIG.

6). Thus, the composition of the pulverized and gathered product is absolutely like that of the sample prior to crushing or pulverizing, no loss of material having taken place in the pneumatic selection.

On the basis of and with references to FIGURES 6, 7 and 8–15, the processing of these particles into the form of tablets and the conveyance of the latter to the analyzing apparatus will now be described.

At the outlet of the mixer 31, connected to the common collector hopper 30 the substances are gathered by means of a flexible tube 32 terminating into a shoe 33 at the free end thereof which is adapted to glide on a stationary horizontal platform 34 integral with a double-action hydraulic press 35 having three columns, one of these of 5 tons per square centimeter. At one of its extremities this platform 34 is provided with an orifice 36 communicating by means of a spout 37 with an excess surplus material transporting means 38; at the other extremity thereof said platform is tangent to and in the same plane with a disc 39 which is adapted to rotate about a vertical axis 40 constituted by one of the columns of the press, and whose periphery carries dies such as 41 which may come to be positioned opposite lower and upper pistons 42 and 43, respectively, of the press 35.

An arm 44 having forks 45 at the two extremities thereof is capable of turning in a horizontal plane about a vertical shaft 46 and is disposed slightly above the platform 39 in such a manner that one of the forks 45 may be brought into contact with a die 41 on said platform. The die 41 can then be grasped and transported by the fork 45 onto the fluorescence analyzing apparatus 47 through rotation of the arm 44, which action also returns a die 41 from the apparatus 47 to the platform 39.

The operation of this device is as follows:

The shoe 33 disposed at the extremity of the flexible tube 32 originating from the mixer 31 is driven cyclically over a fixed course by conventional drive means (not shown) in an alternating rectilinear gliding movement over the platform 34 and the rotary disc 39. At a given instant, during its movement, this shoe is positioned on the center portion of the platform 34 in the position shown in FIGURE 6 and in such a manner that the pipe 32 is closed so that the substances contained therein cannot flow out. In the following movement, the shoe is carried along to above the orifice 36 in the platform so that the substances contained in the pipe 32 which have not been homogenized are evacuated by means of the spout 37. In the course of its return movement, the shoe 33 arrives above the die of the press into which the substance coming from the mixer 31 is discharged and when the shoe subsequently returns to its position above the orifice 36, the excess matter in the tube is evacuated.

FIGURES 8 to 15 show in greater detail these operations as well as the formation of the tablet from the material supplied by tube 32.

FIGURE 8 shows a detail of the die 41 containing a tablet 48 which has been conveyed from the apparatus 47 by means of the arm 44 and which thus has already been analyzed and may consequently be evacuated.

FIGURE 9 illustrates the same die placed on the disc 39 by the arm 44 contacts in a tight manner due to a joint 41' provided on the disc and the disc is then immobilized so that the die is positioned in the axis of the pistons of the press.

In the phase of operation according to FIG. 10, the upper piston 43 and the lower piston 42 of the press will rise with the lower piston 42 being brought to the upper level of the die 41 forcing the tablet 48 to project from the die 41 from which is expelled by a jet of compressed air supplied by a nozzle 49. At the same time, the upper piston 43 continues on ascending movement.

In order to avoid the occlusion of air in the tablet at the time the latter is being compressed or formed, it is necessary that this compression operation be conducted in a vacuum. For this purpose, the upper piston and also the lower piston is equipped with a cover 50 as shown in FIG. 10 which may slide thereon in an air-tight manner due to a joint 51 between cap 50 and piston 43, and whose inner space communicates by means of a flexible tube 52 with a vacuum source (not shown). The upper piston 43 is pierced by a conduit which causes the mutual communication between two orifices 53, 54 which are accommodated at different levels in the piston.

In the next phase of operation illustrated in FIG. 11, the upper piston is at its upper dead point and the lower piston descends to set the elements for preparation of a tablet.

In the next phase of operation according to FIG. 12, the flexible tube 32 (FIG. 6) after having emptied its contents through the orifice 36, discharges from mixer 31 into the die 41 the quantity of substance necessary for the formation of a tablet and then withdraws on its normal cycle.

In the next phase of operation according to FIG. 13, the lower piston 42 is immobilized, and the cap 55 is applied to the lower surface of the disc 39. The upper piston 43 then descends in order to insure a slight compression of the substance 56 and the vacuum cap is applied onto the die 41 in an air tight manner due to a joint 57 on the cap 50. The upper orifice 53 in piston 43 terminates into the inside of the cap, whereas the lower orifice 54 in piston 43 ends above the substance in order to expirate the air therefrom.

In the next phase of operation according to FIGURE 14, the two pistons are displaced against each other, thus compressing the substance 56 into a compact tablet.

In the next phase of operation according to FIGURE 15, the two pistons descend until the tablet 56 which remains under pressure reaches the lower level of the die 41 in the same position as in FIGURE 10.

Finally, in the last phase of operation, the upper piston 43 has risen and has withdrawn from the die, leaving the tablet 56 and the disc 39 has rotated about 120° so that the die can be grasped by the fork 45 of the rotary arm 44 which will transport it into the analyzing apparatus 47 and at the same time a tablet which has been already analyzed will take its place on the disc 39.

It is understood that the movements of rotation of the arm 47 and the disc 39 must be synchronized so that one fork 45 of said arm will be available to grasp a die 41 of the disc 39 when the latter is positioned in the axis of said arm.

The analyzing apparatus 47 properly speaking may be of any known type and the description thereof does not appertain to the framework of the present invention. On the other hand, the installation comprises means for adapting it to the cyclic operation of the analysis.

In one embodiment of the device according to the present invention, each tablet has a diameter of 30 millimeters and the time necessary for the analysis therefor is from 2 to 3 minutes. This device makes it possible to learn at any given instant and with a precision in the order of 3% the average basicity of the mixture which has flown out during the two to three minute interval onto the inlet band 1 with a delay of only about seven minutes.

It is to be understood that the utilization of the results of such a measurement may be applied in any manner; for example, these results may be utilized particularly for controlling, by means of a servo control 60, the operation of the feeding elements in the regulatable supply 1a for the different constituents of the mixture so as to maintain the characteristics of the latter constant.

A similar group of apparatus for tablet formation and analysis could be supplied by samples taken alternatively at different points along the path of the mixture to be analyzed without departing from the scope of the invention. More particularly, this same group of apparatus could be utilized in order to furnish signals of tendency and regulation in a regulation chain.

The process and installation according to the present invention are not limited to the application which has been described herein by way of example resorting to analysis by X-rays, but could also be applied accordingly on tablet samples to other means of analysis whatever it may be. Furthermore, the details which appear in the accompanying drawings should be considered as forming part of the present invention.

While we have shown and described one embodiment in accordance with the instant invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

We claim:

1. Installation for taking in a continuous manner samples of a mixture of grandular products flowing in a translation path and for analyzing said samples continuously comprising
    primary sampler means for continuously gathering at the translation path a specific sample portion of the mixed products flowing therein,
    primary pulverizer means positioned adjacent said primary sampler means for continuously effecting a pulverization of the mixture gathered by said primary sampler means,
    secondary sampler means positioned adjacent primary pulverizer means for continuously gathering a specific sampler portion of the material emerging from said primary pulverizer means,
    secondary pulverizer means positioned adjacent said secondary sampler means for continuously effecting a pulverization of the mixing gathered by said secondary sampler means,
    selector means disposed downstream of said secondary pulverizer means for continuously extracting from the material emerging from said secondary pulverizer means only particles smaller than a selectively predetermined size,
    press means position adjacent said selector means for compressing the material extracted from said selector means into tablets,
    means for analyzing the properties of said tablets and for controlling the constituents of the granular products flowing in said translation path in response thereto, and
    transfer means for transferring said tablets from said press means to said analyzing means in a continuous manner.

2. An installation as defined in claim 1 wherein said primary sampler means includes a sampling trough mounted for reciprocating movement across the path of said mixture flowing in said translation path.

3. An installation as defined in claim 1 wherein said secondary sampler means has first and second stages in series relationship, each stage including a spout mounted for reciprocating movement across the path of the mixture flowing from said primary pulverizer means to said secondary pulverizer means, the spout of said first stage receiving a portion of the material flowing from said primary pulverizer means and the spout of said second stage receiving a portion of the material flowing from said spout in said first stage and discharging material to said secondary pulverizer means.

4. An installation as defined in claim 1 wherein said selector means includes a pneumatic selection device and a blower supplying compressed air to said selection device for separating particles in accordance with their granular weight.

5. An installation as defined in claim 4 wherein said selector means further includes means for pre-heating the air supplied by said blower to said pneumatic selection device.

6. An installation as defined in claim 5 wherein said selector means further includes a pneumatic centrifugal separator connected to the outlet of said pneumatic selection device for separating the particles from the air which is applied to said centrifugal separator from said pneumatic selection device, and having an outlet returning air to said blower.

7. An installation as defined in claim 6 wherein said selector means further includes a vibrating filter having an inlet connected to said blower and an outlet for filtered particles present in the air returned to said blower from said centrifugal separator.

8. An installation as defined in claim 7 wherein a mixer is connected between the outlets of said centrifugal separator and filter and said press means for mixing the particles from said centrifugal separator and filter prior to application thereof to said press.

9. An installation as defined in claim 6 wherein said primary sampler means includes a sampling trough mounted for reciprocating movement across the path of said mixture flowing in said translation path.

10. An installation as defined in claim 8 further including a flexible tube connected at one end to the outlet of said mixer and a shoe nozzle connected to the other end of said flexible tube, said shoe nozzle being in operative contact with said press means for supplying material thereto from said mixer.

11. An installation as defined in claim 10 wherein said press means is a double action hydraulic press.

12. An installation as defined in claim 11 wherein said press means includes opposed pistons and a horizontal die carrying disc mounted for rotation on a shaft eccentric to the axis of said pistons, dies mounted on the periphery of said disc.

13. An installation as defined in claim 2 wherein said analyzing means includes an apparatus for effecting fluorescence examination of material subjected to X-ray radiation.

14. An installation as defined in claim 13 wherein said analyzing and control means includes regulatible supply feeding members for controlling the constituents of the mixture of granular products supplied to said translation path, and servo control means for controlling said supply feeding members in response to the analysis of the samples provided by said apparatus for effecting fluorescence examination thereof.

15. Installation according to claim 1 wherein said secondary pulverizer means is provided in the form of pebble-mill regulated to grind, during the formation of one tablet, a quantity of the mixed product at least 100 times greater than that which will make up said tablet.

16. Installation according to claim 1 wherein said secondary pulverizer means furnishes particles at least 90% of which have a maximum dimension comprised between 1 and 20 microns.

17. Installation according to claim 9 wherein the air is heated by a torch.

18. Installation according to claim 12 wherein a fixed platform is disposed in the same plane as the rotating dye-carrying disc and is positioned adjacent thereto.

19. Installation according to claim 18 wherein the fixed platform is provided with an orifice for evacuating surplus material.

20. Installation according to claim 1 wherein said means for analyzing includes means to measure the basicity of a mixture of iron ores by dosing the proportions of the weights of calcium and silicon oxides contained in said mixture.

21. Installation according to claim 20 wherein the mixture of ores comprises coke, the latter being incorporated into the mixture upstream of said primary sampler means.

22. Installation according to claim 20 wherein the mixture of ores comprises coke, the latter being incorporated into the mixture downstream of said primary sampler means.

23. An installation as defined in claim 19 further including means for cyclically sliding said shoe nozzle onto said die carrying disc from said orifice for evacuating surplus to a postion overlying a die on said disc.

24. An installation as defined in claim 23 further including a horizontal arm rotating on a vertical shaft, and means connected to both ends of said arm for grasping and releasing a die on said die carrying disc.

25. An installation as defined in claim 24 further including compressed air means mounted adjacent to said die carrying disc for expelling material discharged from said die; said pistons being arranged to enter said disc.

26. An installation as defined in claim 25 wherein each of said pistons on said press means is provided with a cap adapted to slide in an air-tight manner on its respective piston and having means for effecting a seal with the surface of the die which it contacts, and vacuum means connected to one of said caps for evacuating the air from a die enclosed by said caps.

References Cited

UNITED STATES PATENTS 2,512,575  6/1950  Champaygne _____ 250—51.5

OTHER REFERENCES

"The Use of Briquets Formed From Metal Grindings for the Spectrographic Analysis of Steel," by R. E. Nusbaum et al. from the "Journal of the Optical Society of America," vol. 34, No. 1, January 1944, p. 33 to 40.

WILLIAM F. LINDQUIST, Primary Examiner

U.S. Cl. X.R.

264—109